(12) United States Patent
Chen

(10) Patent No.: US 12,281,210 B2
(45) Date of Patent: Apr. 22, 2025

(54) TREATMENT PROCESS OF POLYMERIC DISPERSIONS BASED ON THE USE OF SPECIFIC ORGANIC PEROXIDES

(71) Applicant: ARKEMA FRANCE, Colombes (FR)

(72) Inventor: Long Chen, Changshu (CN)

(73) Assignee: ARKEMA FRANCE, Colombes (FR)

( * ) Notice: Subject to any disclaimer, the term of this patent is extended or adjusted under 35 U.S.C. 154(b) by 662 days.

(21) Appl. No.: 17/637,201

(22) PCT Filed: Aug. 27, 2020

(86) PCT No.: PCT/EP2020/073955
§ 371 (c)(1),
(2) Date: Feb. 22, 2022

(87) PCT Pub. No.: WO2021/037969
PCT Pub. Date: Mar. 4, 2021

(65) Prior Publication Data
US 2022/0298307 A1    Sep. 22, 2022

(30) Foreign Application Priority Data
Aug. 28, 2019  (FR) ........................ 1909473

(51) Int. Cl.
C08J 3/05     (2006.01)
C08K 5/14     (2006.01)

(52) U.S. Cl.
CPC ............... C08J 3/05 (2013.01); C08K 5/14 (2013.01); C08J 2333/08 (2013.01)

(58) Field of Classification Search
CPC ..................... C08J 3/05; C08K 5/14
USPC ......................................... 524/460
See application file for complete search history.

(56) References Cited

U.S. PATENT DOCUMENTS

| 3,534,009 | A | 10/1970 | Beresniewicz |
| 4,062,662 | A | 12/1977 | Kuxdorf et al. |
| 4,266,949 | A | 5/1981 | Kuxdorf et al. |
| 5,886,140 | A | 3/1999 | Olivarres et al. |
| 6,462,138 | B1 | 10/2002 | Rupaner et al. |
| 6,740,691 | B1 | 5/2004 | Lorteije et al. |
| 2005/0222374 | A1 | 10/2005 | Muller et al. |
| 2012/0083563 | A1* | 4/2012 | Song ............... C08F 212/08 524/460 |

FOREIGN PATENT DOCUMENTS

DE    19741184 A1    3/1999

OTHER PUBLICATIONS

ISA/EP; International Search Report and Written Opinion for International Patent Application No. PCT/EP2020/073955 dated Nov. 4, 2020, 8 pages.

* cited by examiner

Primary Examiner — Deve V Hall
(74) Attorney, Agent, or Firm — NK Patent Law

(57) ABSTRACT

The present invention relates to a process for treating a polymeric dispersion prepared by polymerizing at least one or more unsaturated monomers comprising adding to said polymeric dispersion a sufficient amount of one or more organic peroxides selected from the group consisting of peroxydicarbonates, diacyl peroxides and mixtures thereof. The invention also deals with the use of organic peroxides selected from the group consisting of peroxydicarbonates, diacyl peroxides and mixtures thereof to treat a polymeric dispersion prepared by polymerizing at least one or more unsaturated monomers, preferably in order to reduce the amount of volatile organic compounds present in said polymeric dispersion.

15 Claims, No Drawings

TREATMENT PROCESS OF POLYMERIC DISPERSIONS BASED ON THE USE OF SPECIFIC ORGANIC PEROXIDES

CROSS-REFERENCE TO RELATED APPLICATIONS

This application is a U.S. National Stage application of International Patent Application No. PCT/EP2020/073955, filed on Aug. 27, 2020, which claims the benefit of French Patent Application No. FR1909473, filed on Aug. 28, 2019.

The present invention relates to a process for treating a polymeric dispersion prepared by polymerizing at least one or more unsaturated monomers comprising a step of adding to said polymeric dispersion one or more organic peroxides selected from the group consisting of peroxydicarbonates, diacyl peroxides and mixtures thereof.

The invention also deals with the use of one or more organic peroxides selected from the group consisting of peroxydicarbonates, diacyl peroxides and mixtures thereof to treat a polymeric dispersion prepared by polymerizing at least one or more unsaturated monomers, preferably in order to reduce the amount of volatile organic compounds present in said polymeric dispersion.

Preparations of dispersions of synthetic polymers are generally carried out by polymerizing unsaturated monomers in a liquid medium, especially in water or organic solvents, in the presence of one or more radical initiators, such as organic peroxides, azo compounds such as azobisisobutyronitrile (AIBN), inorganic peroxides, namely persulfates such as sodium persulfate ($Na_2S_2O_8$), potassium persulfate ($K_2S_2O_8$) or ammonium persulfate (($NH_4)_2S_2O_8$), or mixtures thereof.

The dispersions of synthetic polymers obtained at the end of the polymerization process may contain volatile organic compounds that result from incomplete conversion of unsaturated monomers, i.e. unreacted unsaturated monomers, impurities of raw materials and/or undesirable by-products formed during the polymerization reaction.

However, the residual presence of these volatile organic compounds in the obtained dispersions of synthetic polymers may cause several issues, namely health issues, especially when they are present in a significant amount, in various applications and/or technical fields area.

For instance, in the food industry, food contact materials such as packaging, processing equipment or food grade lubricants are generally obtained from dispersions of synthetic polymers. Hence, the monitoring of the amount of volatile organic compounds is key to mitigate potential contamination risks, health risks and to meet industry regulatory standards that require that these residual compounds should be identified and quantified sometimes to extremely low levels.

Similarly, the presence of these residual volatile organic compounds in indoor coatings may also be responsible for impeding the air quality and soaring pollution and therefore affecting health and well-being of people, particularly building occupants. For example, polymeric dispersions used to formulate paints, lacquers, varnishes and other coatings may trigger the emission of hazardous volatile organic compounds and have a negative trickle-down effect on health conditions. The adverse health effects caused by these compounds can range from minor complaints, such as irritation of the nasal and ocular mucosa, to chronic complications such as the exacerbation of asthma. In addition, resins used in these indoor coatings can also generate an unpleasant odor caused by the aforementioned volatile organic compounds that could have a deterrent effect on their use, especially when they are implemented to coat confined areas.

On a commercial standpoint, the incomplete conversion of unsaturated monomers may also hinder the commercial development and the economic value of some polymerization processes.

Therefore, the presence of these residual volatile organic compounds in polymeric dispersions is undesirable and may not even be countenanced in some specific technical fields area for environmental and/or health reasons.

Therefore, several chemical and/or physical methods have already been developed to significantly minimize the presence of these residual volatile organic compounds in polymeric dispersions.

As an illustration of a chemical method, the U.S. Pat. No. 3,534,009 describes the implementation of a post-polymerization process intended to reduce the amount of residual vinyl acetate monomers issued from the main copolymerization of vinyl acetate and ethylene by reducing the pressure to atmospheric level and providing fresh radical generating materials, especially hydrogen peroxide activated through the action of a reducing agent. In particular, this reference outlines the use of a hydrogen peroxide-zinc formaldehyde sulfoxylate redox system. According to this reference, the purpose of these fresh radical generating materials is to further polymerize the residual unreacted monomeric compounds that are still present after the main polymerization.

However, this post-polymerization process displays the disadvantage of being carried out in two-steps and requires the implementation of additional equipment that would lead to increase the entire cost of the manufacture of the aforementioned copolymer.

Moreover, the addition of a hydrogen peroxide-zinc formaldehyde sulfoxylate redox system after the completion of the main polymerization generates new undesirable volatile organic compounds, such as formaldehyde, acetone, tert-butanol and tert-butyl acrylate, and leads to a concentration of residual monomers amounting between 300 and 500 ppm which could still be unacceptable depending on the final application of the obtained resin or polymeric dispersion. As a result, this post-polymerization process may overall produce a significant amount of volatile organic compounds due to the soaring concentration of newly generated non polymerizable volatile organic compounds.

Besides, in some cases, a fraction of the amount of the added radical generating materials can sustain at the end of the post-polymerization process and with the residual unreacted monomers may be responsible for generating an unpleasant odor in the obtained resin.

Another flaw of this process is that the use of a salt as a reducing agent can potentially destabilize the polymeric dispersion obtained after the polymerization process.

Alternatively, the U.S. Pat. No. 4,062,662 relates to a physical method called steam stripping which involves the implementation of sparging air and/or vapor through latices or polymeric dispersions. This method is carried out in a degassing column by passing through gas and/or water vapor upwards and lattices or polymer dispersions downwards in countercurrent.

Nonetheless, this method has the inconvenience of not being able to efficiently remove the residual unreacted monomers and requires once again the use of new additional equipment to perform this specific operation.

Furthermore, the U.S. Pat. No. 6,740,691 deals with a process for treating aqueous polymer latex or dispersion of synthetic polymers comprising, in a first step, reducing only the unreacted unsaturated monomers by polymerization thanks to the addition of reducing agents, such as sodium formaldehyde sulphoxylate, and free radical generators, such as hydrogen peroxide or hydroperoxide, namely tert-butyl hydroperoxide, and, in a second step, removing all the volatile organic compounds, including non-polymerizable volatile organic compounds, by steam stripping. The purpose of the second step is to remove the non-polymerizable volatile organic compounds that were produced in the first step of the process and during the main polymerization.

Once again, this process has the disadvantages of implementing two successive steps and new additional equipment in order to perform the steam-stripping step. Even though the process comprises a second step in order to remove the aforementioned non-polymerizable volatile organic compounds, a fraction of the amount of the added free radical generators, especially tert-butyl hydroperoxide, may sustain at the end of the overall process.

In addition, the reducing agents are generally used under the form of salts and may induce a potential destabilization of the polymeric dispersion or the reaction medium.

As a result, it remains a real need to develop a method which is able to efficiently remove the overall concentration of volatile organic compounds which are present in dispersions of polymers prepared by polymerizing of at least one or more unsaturated monomers without encountering the aforementioned drawbacks in order to fulfill the requirements set by different technical fields area, especially in the food industry and indoor coatings.

In particular, one of the goals of the present invention is to minimize the concentration of the residual unsaturated monomers that have not fully reacted during the main polymerization process without generating at the same time new additional volatile organic compounds.

Furthermore, another goal of the present invention is to minimize the overall concentration of volatile organic compounds by implementing a more convenient process than those previously described, especially which do not require any new additional equipment.

More specifically, one of the goals of the present invention is replace the use of hydroperoxides, such as tert-butylhydroperoxide and tert-amylhydroperoxide activated through the action of a reducing agent.

The present invention relates to a process for treating a polymeric dispersion prepared by polymerizing at least one or more unsaturated monomers comprising adding to said polymeric dispersion one or more organic peroxides selected from the group consisting of peroxydicarbonates, diacyl peroxides and mixtures thereof, preferably diacyl peroxides.

The use of the previously defined organic peroxides is able to decrease the concentration of the residual unsaturated monomers, which have not fully reacted during a polymerization process without generating at the same time new additional volatile organic compounds.

In other words, the process defined according to the present invention is able to remove a significant fraction of the volatile organic compounds, especially unreacted unsaturated monomers, which may be present at the end of a polymerization process, without producing non-polymerizable volatile organic compounds.

Therefore, the present invention provides an improved method for accomplishing the post-polymerization step in the process of polymerizing one or more unsaturated monomers.

Especially, the above-mentioned process can reduce the concentration of the volatile organic compounds to levels lower than 300 ppm and, in some cases, even lower than 100 ppm, and more preferably less than 30 ppm in polymeric dispersions prepared by polymerization of one or more unsaturated monomers.

Consequently, the process of the present invention is able to deliver polymeric dispersions that can fulfill the requirements set by different technical fields area, including environmental stipulations, especially in targeted technical fields where consumers are demanding healthy and sustainable solutions like the food industry and indoor coatings.

In particular, the polymeric dispersions obtained after the implementation of the process of the present invention can efficiently be used to formulate indoor coatings since they do not display an unpleasant odor. Indeed, there are no residues of the aforementioned organic peroxides at the end of the process of the present invention contrary to the use of hydrogen peroxide activated through the action of a reducing agent such as a hydrogen peroxide-zinc formaldehyde sulfoxylate redox system.

It also means that the process of the present invention is able to restore the economic value of a classical polymerization process that was discarded because of the incomplete conversion of unsaturated monomers and can even add an environmental aspect to it.

Furthermore, the process of the present invention is very convenient to implement, especially since the feeding time may be fast, and does not require the need of using additional equipment, especially for performing a steam-stripping step.

It also bespeaks that the process of the present invention proves to be both environmentally friendly and economically competitive.

The invention also deals with the use of one or more organic peroxides selected from the group consisting of peroxydicarbonates, diacyl peroxides and mixtures thereof, to treat a polymeric dispersion prepared by polymerizing at least one or more unsaturated monomers, preferably in order to reduce the amount of volatile organic compounds present in said polymeric dispersion.

In other words, the aforementioned organic peroxide(s) are used to chase the volatile organic compounds present in polymeric dispersions.

The aforementioned organic peroxide(s) may also be used to improve the odor of said polymeric dispersion.

Another aspect of the present invention is a polymeric dispersion obtainable from the aforementioned process, especially a (meth)acrylic polymeric dispersion.

The (meth)acrylic polymeric dispersion preferably contains less than 100 ppm of volatile organic compound, more preferably less than 50 ppm, even more preferably less than 30 ppm.

The (meth)acrylic polymeric dispersion may be efficiently used in food contact materials such as packaging, processing equipment or food grade lubricants and in indoor coatings.

Other characteristics, aspects and advantages of the invention will emerge even more clearly on reading the description and the example that follows.

In the text herein below, and unless otherwise indicated, the limits of a range of values are included in that range, in particular in the expressions "between" and "ranging from . . . to . . . ".

Moreover, the expression "at least one" used in the present description is equivalent to the expression "one or more".

The term "polymerization" encompasses both homo- and copolymerization of one or more unsaturated monomers.

The term "dispersion" encompasses both suspensions and emulsions.

According to the present invention, the term "dispersion" also encompasses the term "latex".

Process

The process for treating a polymeric dispersion prepared by polymerizing at least one or more unsaturated monomers comprises a step of adding to said polymeric dispersion a sufficient amount of one or more organic peroxides selected from the group consisting of peroxydicarbonates, diacyl peroxides and mixtures thereof.

More preferably, the organic peroxides are selected from the group consisting of diacyl peroxides.

The diacyl peroxides may be selected from the group consisting of dilauroyl peroxide, disuccinic acid peroxide, dibenzoylperoxide, di-(3,3,5-trimethylhexanoyl)peroxide, didecanoyl peroxide and mixtures thereof, especially dilauroyl peroxide.

Dilauroyl peroxide is sold under the name of Luperox® LP by Arkema.

The peroxydicarbonates may be selected from the group consisting of diisopropyl peroxydicarbonate, di(2-ethylhexyl)peroxydicarbonate, di(sec-butyl) peroxydicarbonate, di(n-propyl) peroxydicarbonate, bis(tert-butylcyclohexyl) peroxydicarbonate, di(3-methoxybutyl)peroxydicarbonate, dicetylperoyidicarbonate, dimyristylperoxydicarbonate, bis(4-tert)butylcyclohexyl) peroxydicarbonate and mixtures thereof.

More preferably, the peroxydicarbonates are selected from the group consisting of di(2-ethylhexyl)peroxydicarbonate, bis(tert-butylcyclohexyl)peroxydicarbonate and mixtures thereof, in particular di(2-ethylhexyl)peroxydicarbonate and bis(tert-butylcyclohexyl)peroxydicarbonate.

Di(2-ethylhexyl)peroxydicarbonate is sold under the name of Luperox® 223M75 by Arkema.

According to a preferred embodiment, the organic peroxides are selected from the group consisting of dilauroyl peroxide, di(2-ethylhexyl)peroxydicarbonate, bis(tert-butylcyclohexyl)peroxydicarbonate and mixture thereof, especially dilauroyl peroxide.

Preferably, the organic peroxides have a half-life temperature at 10 hours ranging from 40° C. to 75° C., more preferably ranging from 40° C. to 70° C. at 10 hours.

According to the present invention, the terms "half-life temperature at 10 hours" refer to the temperature at which the half of the aforementioned organic peroxides has decomposed in ten hours. In other words, it is the temperature at which a loss of one-half of the peroxide's active oxygen content occurs after 10 hours.

Classically, the half-life temperature at 10 hours of the organic peroxides is determined by measuring the decomposition rate in n-decane or n-dodecane. Said 10-hour half-life temperature is preferably measured in n-dodecane at a concentration of 0.1 mol per liter (mol.1$^{-1}$) by means of a differential scanning calorimetry (DSC) curve.

The organic peroxides can be added into the polymeric dispersion in an amount ranging from 0.2% to 5% by weight, preferably from 0.6% to 2% by weight, more preferably from 1% to 1.6% by weight relative to the total weight of the polymeric dispersion.

Preferably, the unsaturated monomers are selected from the group consisting of vinyl monomers, especially chosen among monoethylenically-unsaturated (meth)acrylic. monomer including esters, amides, and nitriles of (meth)acrylic acid, such as, for example, (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (methacrylate), N,N-dialkyl aminoalkyl (meth)acrylate; (meth)acrylonitrile and (meth)acrylamide; styrene or alkyl-substituted styrenes; butadiene; vinyl acetate, vinyl propionate, or other vinyl esters; vinyl chloride, vinylidene chloride, and N-vinyl pyrollidone; allyl methacrylate, diallyl phthalate, 1,3-butylene glycol dimethacrylate, 1,6- hexanedioldiacrylate, and divinyl benzene; (meth)acrylic acid, crotonic acid, itaconic acid, sulfoethyl methacrylate, phosphoethyl methacrylate, fumaric acid, maleic acid, monomethyl itaconate, monomethyl fumarate, monobutyl fumarate, and maleic anhydride; and mixture thereof.

More preferably, the unsaturated monomers are selected from the group consisting of vinyl esters monomers, more preferably vinyl esters of carboxylic acids unsaturated such as vinyl acetate or vinyl propionate, (meth)acrylic acid esters monomers, styrene monomers and mixtures thereof.

According to a preferred embodiment, the unsaturated monomers used to prepare the polymeric dispersion are formulated in an aqueous composition that may preferably comprise one or more surfactants.

Preferably, the polymeric dispersion is an aqueous polymeric dispersion, especially a polymeric dispersion obtained by polymerizing at least one or more of the aforementioned unsaturated monomers.

More preferably, the polymeric dispersion comprises copolymerized monoethylenically-unsaturated (meth)acrylic, in particular copolymerized monoethylenically-unsaturated (meth)acrylic and styrene.

Even more preferably, the polymeric dispersion is an aqueous dispersion of (meth)acrylic polymer, especially an aqueous dispersion of styrene-acrylate polymer.

The polymeric dispersion may further comprise volatile organic compounds containing residual monomers issued from the polymerization of the unsaturated monomers.

Preferably, the polymeric dispersion comprises residual monomers selected from the group consisting of butyl acrylate, butyl methacrylate, methacrylic acid, 2-hydroxyethyl acrylate, styrene and mixture thereof.

Preferably, the process of the present invention comprises adding the one or more organic peroxides as previously described at a temperature ranging from 75 to 90° C., preferably at a temperature ranging from 80 to 85° C., preferably for a period of time ranging 1.5 to 4 hours, more preferably for a period of time ranging 2 to 3.5 hours.

Advantageously, the addition of the aforementioned organic peroxides is completed in one step.

In particular, the process of the present invention may be one of the steps implemented after the polymerization of one or more unsaturated monomers as previously described.

The process of the present invention is preferably a post-polymerization step of a process of polymerization of at least one or more unsaturated monomers.

According to a preferred embodiment, the polymeric dispersion is an aqueous dispersion of (meth)acrylic polymer, in particular acrylic polymer, and the organic peroxides are selected from the group consisting of peroxydicarbonates, diacyl peroxides and mixtures thereof.

According to this embodiment, the organic peroxides are preferably selected from the group consisting of dilauroyl peroxide, di(2-ethylhexyl)peroxydicarbonate, bis(tert-butylcyclohexyl)peroxydicarbonate and mixture thereof, especially dilauroyl peroxide.

According to a preferred embodiment, the present invention aims at providing a process comprising:
  polymerizing one or more unsaturated monomers in the presence of one or more free radical initiators, preferably selected among the group consisting of organic peroxides, inorganic peroxides and mixture thereof, in order to obtain a polymeric dispersion, especially an aqueous polymeric dispersion as previously defined,
  adding to said polymeric dispersion one or more organic peroxides selected from the group consisting of peroxydicarbonates, diacyl peroxides and mixtures thereof as previously defined.

Use

The present invention also deals with the use of one or more organic peroxides selected from the group consisting of peroxydicarbonates, diacyl peroxides and mixtures thereof, as previously defined, to treat the aforementioned polymeric dispersion prepared by polymerizing at least one or more unsaturated monomers.

Preferably, the previously defined organic peroxide(s) is or are used to reduce the amount of volatile organic compounds present in said polymeric dispersion.

More preferably, the previously defined organic peroxide(s) is or are used to reduce the amount of residual monomers issued from the polymerization of the unsaturated monomers.

The volatile organic compounds preferably contain residual monomers issued from the polymerization of the unsaturated monomers.

The aforementioned organic peroxide(s) may also be used to improve the odor of said polymeric dispersion, especially used in indoor coatings.

In other words, the aforementioned organic peroxide(s) may also be used to improve the odor of indoor coatings.

According to the present invention, the terms "improve the odor" mean that the organic peroxides as previously defined are able to reduce the amount of volatile organic compounds in the polymeric dispersions to very low levels so that their evaporation will be minimized.

Especially, the organic peroxides as previously defined are able to reduce the amount of volatile organic compounds in the polymeric dispersions to less than 300 ppm, preferably to less than 100 ppm, more preferably less than 50 ppm, even more preferably less than 30 ppm, relative to the total weight of said dispersion.

Polymeric Dispersion

Another aspect of the present invention lies on a polymeric dispersion obtainable from the process previously defined.

The polymeric dispersion preferably contains less than 300 ppm of volatile organic compounds, particularly less than 100 ppm, more preferably less than 50 ppm, even more preferably less than 30 ppm.

Preferably, the invention is directed to a (meth)acrylic polymeric dispersion obtainable from the aforementioned process.

The organic peroxides are selected from the aforementioned organic peroxides.

The (meth)acrylic polymeric dispersion contains less than 300 ppm, preferably less than 100 ppm of volatile organic compound, more preferably less than 50 ppm, even more preferably less than 30 ppm, relative to the total weight of said dispersion.

The (meth)acrylic dispersion is preferably an aqueous (meth)acrylic dispersion, even more preferably an aqueous acrylic dispersion.

The (meth)acrylic polymeric dispersion may be efficiently used in food contact materials such as packaging, processing equipment or food grade lubricants and in indoor coatings.

Especially, the (meth)acrylic polymeric dispersion may be used in indoor coatings.

The examples below are given as illustrations of the present invention.

EXAMPLES

I. Preparation of the Polymeric Dispersion

The features of an aqueous acrylic resin (ENCOR® 5181 CS, produced by ACR, CHINA) are given in Table 1 detailed below.

TABLE 1

| Features the acrylic resin | |
|---|---|
| Solid content % | Viscosity, cps |
| 55~57 | 800 |

Butyl acrylate (denoted hereafter BA) is added to the aqueous acrylic resin detailed in Table 1 in order to obtain an overall amount of 2000 ppm. The mixture is then stirred and dispersed for 1 hour and half to obtain an aqueous acrylic dispersion.

II. Tested Organic Peroxides

The organic peroxides implemented in the experimental protocol described hereafter are listed below:
  t-Butyl peroxyneodecanoate sold under the name Luperox® 10M75 (denoted 10M75) having a half-life temperature at 10 hours of 48° C.,
  tert-amyl peroxypivalate sold under the name Luperox® 554M75 (denoted 554M75) having a half-life temperature at 10 hours of 55° C.,
  tert-butyl hydroperoxide and sodium pyrosulfite (denoted TBHP from Arkema+SBS from Enox)
  bis(tert-butylcyclohexyl) peroxydicarbonate having a half-life temperature at 10 hours of 48° C.,
  di(2-ethylhexyl)peroxydicarbonate sold under the name of Luperox® 223M75 (denoted 223M75) having a half-life temperature at 10 hours of 49° C.
  dibenzoyl peroxide sold under the name of Luperox® A75 (denoted A75) having a half-life temperature at 10 hours of 73° C.,
  dilauroyl peroxide sold under the name of Luperox® LP (denoted LP) having a half-life temperature at 10 hours of 64° C.

III. Experimental Protocol 2.4 grams of dilauroyl peroxide sold under the name Luperox® LP by Arkema are added to the 150 grams of aqueous acrylic dispersion previously described by one shot at a temperature of 80° C. After 3 hours, the residual concentration of volatile organic compounds in the dispersion is recorded.

This protocol is identical for all the organic peroxides described in part II except for the redox system tert-butyl hydroperoxide and sodium pyrosulfite (TBHP+SBS) wherein tert-butyl hydroperoxide has been added at 60° C. for 3 hours.

IV. Results

The results are given in Table 2 below:

TABLE 2

Assessment of the volatile organic compounds present in the aqueous acrylic dispersion

| Ingredients | Residual BA, ppm | Acetone, ppm | Tert-buty alcohol(TBA) ppm | Tert-amyl alcohol (TAA), ppm | Benzene, ppm |
|---|---|---|---|---|---|
| TBHP + SBS | 28 | 271 | 268 | / | / |
| 554M75 | 1112 | 96 | / | 49 | / |
| 10M75 | 532 | 39 | 1471 | / | / |
| A75 | 18 | / | / | / | 324 |
| LP | 22 | / | / | / | / |
| bis(tert-butylcyclohexyl) peroxydicarbonate | 36 | / | / | / | / |
| 223M75 | 88 | / | / | / | / |

The results show that the redox system TBHP+SBS generates a significant amount of new volatile organic compounds whereas the organic peroxides used according to the present invention LP, 223M75 and bis(tert-butylcyclohexyl) peroxydicarbonate are able to significantly reduce the amount of residual butyl acrylate (BA) without generating new additional components.

The results also show that the peroxyesters 554M75 and 10M75 are less efficient than the organic peroxides the present invention in terms of reducing the amount of residual butyl acrylate.

In addition, the tested peroxyesters also generate new additional volatile organic compounds, such as acetone tert-amylalcohol and tert-butylalcohol, i.e. both non-polymerizable and polymerizable volatile organic compounds.

Finally, the results also demonstrate that Luperox® A75 (dibenzoylperoxide) which has a half-life temperature at 10 hours of 73° C. is able to reduce the residual amount of butyl acrylate.

The invention claimed is:

1. A process for treating an aqueous polymer dispersion prepared by polymerizing at least one or more ethylenically unsaturated monomers, the process comprising adding to said polymeric dispersion one or more organic peroxides selected from the group consisting of peroxydicarbonates, diacyl peroxides and mixtures thereof.

2. The process according to claim 1, wherein the organic peroxides have a half-life temperature ranging from 40° C. to 75° C. at 10 hours.

3. The process according to claim 1, wherein the organic peroxides are diacyl peroxides selected from the group consisting of dilauroyl peroxide, disuccinic acid peroxide, dibenzoylperoxide, di-(3,3,5-trimethylhexanoyl) peroxide, didecanoyl peroxide and mixtures thereof.

4. The process according to claim 1, wherein the organic peroxides are peroxydicarbonates selected from the group consisting of diisopropyl peroxydicarbonate, di(2-ethylhexyl) peroxydicarbonate, di(sec-butyl) peroxydicarbonate, di(n-propyl) peroxydicarbonate, bis(tert-butylcyclohexyl) peroxydicarbonate, di(3-methoxybutyl) peroxydicarbonate, dicetylperoxidicarbonate, dimyristylperoxydicarbonate, bis (4-tert)butylcyclohexyl) peroxydicarbonate and mixtures thereof.

5. The process according to claim 1, wherein the organic peroxide(s) are added to the polymeric dispersion in an amount ranging from 0.2% to 5% by weight, relative to the total weight of the polymeric dispersion.

6. The process according to claim 1, wherein the unsaturated monomers are selected from the group consisting of vinyl monomers, styrene or alkyl-substituted styrenes; butadiene; vinyl acetate, vinyl propionate, or other vinyl esters; vinyl chloride, vinylidene chloride, and N-vinyl pyrollidone; allyl methacrylate, diallyl phthalate, 1,3-butylene glycol dimethacrylate, 1,6-hexanedioldiacrylate, and divinyl benzene; (meth)acrylic acid, crotonic acid, itaconic acid, sulfoethyl methacrylate, phosphoethyl methacrylate, fumaric acid, maleic acid, monomethyl itaconate, monomethyl fumarate, monobutyl fumarate, maleic anhydride; and mixtures thereof.

7. The process according to claim 1, wherein the polymeric dispersion further comprises one or more residual monomers issued from the polymerization of the unsaturated monomers.

8. The process according to claim 1, wherein said treatment is a post-polymerization step of a process of polymerization of at least one or more unsaturated monomers.

9. The process according to claim 1, wherein the polymeric dispersion is an aqueous dispersion of (meth)acrylic polymer.

10. The process according to claim 1, wherein adding the one or more organic peroxides to the aqueous polymeric dispersion reduces an amount of volatile organic compounds present in said aqueous polymeric dispersion.

11. The process according to claim 1, wherein adding the one or more organic peroxides to the aqueous polymeric dispersion improves an odor of said polymeric dispersion.

12. The process of claim 1, wherein vinyl monomers are selected from the group consisting of monoethylenically-unsaturated (meth)acrylic monomers.

13. The process of claim 12, wherein the monoethylenically-unsaturated (meth)acrylic monomers are selected from the group consisting of esters, amides, and nitriles of (meth) acrylic acid.

14. The process of claim 13, wherein the monoethylenically-unsaturated (meth)acrylic monomers are selected from the group consisting of methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (methacrylate), N,N-dialkyl aminoalkyl (meth)acrylate; (meth)acrylonitrile and (meth)acrylamide.

15. A polymeric dispersion, obtainable from the process as defined in claim 1.

* * * * *